US007738386B2

(12) United States Patent
Baker et al.

(10) Patent No.: US 7,738,386 B2
(45) Date of Patent: Jun. 15, 2010

(54) METHOD TO ENSURE THAT LIFE-CRITICAL DATA IS TRANSPORTED EFFECTIVELY AND SAFELY

(75) Inventors: Steven D. Baker, Beaverton, OR (US); Steven J. Marcaccini, Aurora, OR (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 465 days.

(21) Appl. No.: 11/750,526

(22) Filed: May 18, 2007

(65) Prior Publication Data

US 2008/0285462 A1    Nov. 20, 2008

(51) Int. Cl.
*H04Q 1/20* (2006.01)
*G06N 5/00* (2006.01)
*G06F 11/00* (2006.01)

(52) U.S. Cl. .................. 370/241; 370/338; 370/252; 370/255; 370/349; 703/13

(58) Field of Classification Search ......... 370/241, 370/338, 252, 254, 255, 349; 703/13
See application file for complete search history.

(56) References Cited

U.S. PATENT DOCUMENTS

| 6,317,599 | B1 * | 11/2001 | Rappaport et al. | 455/446 |
| 7,055,107 | B1 * | 5/2006 | Rappaport et al. | 715/848 |
| 7,171,208 | B2 * | 1/2007 | Rappaport et al. | 455/445 |
| 7,286,802 | B2 * | 10/2007 | Beyme et al. | 455/67.14 |
| 7,570,596 | B2 * | 8/2009 | Pan et al. | 370/241 |
| 2003/0156549 | A1 * | 8/2003 | Binder et al. | 370/252 |
| 2004/0236547 | A1 * | 11/2004 | Rappaport et al. | 703/2 |
| 2008/0221918 | A1 * | 9/2008 | Petersen et al. | 705/2 |

FOREIGN PATENT DOCUMENTS

WO    WO 2004/066077 A2    8/2004

OTHER PUBLICATIONS

International Searching Authority, International Search Report and Written Opinion in PCT No. PCT/US2008/061733, Mailed Sep. 26, 2008.
Sloane, E.B. et al., "Conceptual Design and Resources for a General-Purpose Safety and Performance Verification and Validation Toolkit (V2T) for Life-Critical Wireless Medical Device Networks (WMDN)", Engineering in Medicine and Biology Society, 2005, IEEE-EMBS 2005. 27th Annual International Conference.
Gehlot, V. et al., "Ensuring Patient Safety in Wireless Medical Device Networks", Computer, vol. 39, Issue 4, Apr. 2006 pp. 54-60.

* cited by examiner

*Primary Examiner*—Chi H Pham
*Assistant Examiner*—Ahmed Elallam
(74) *Attorney, Agent, or Firm*—Sonny Z. Zhan

(57) ABSTRACT

The invention relates generally to a method to ensure that mission-critical data is transported safely and effectively across a wireless LAN, and more particularly, to a method which determines network latency under model network loads and ensures that the RF signal strength requirements are met for all RF coverage areas supported by the wireless network, allowing for data transmission which is effective and complete, with acceptable latency and loss, and no unacceptable corruption of the data.

17 Claims, 7 Drawing Sheets

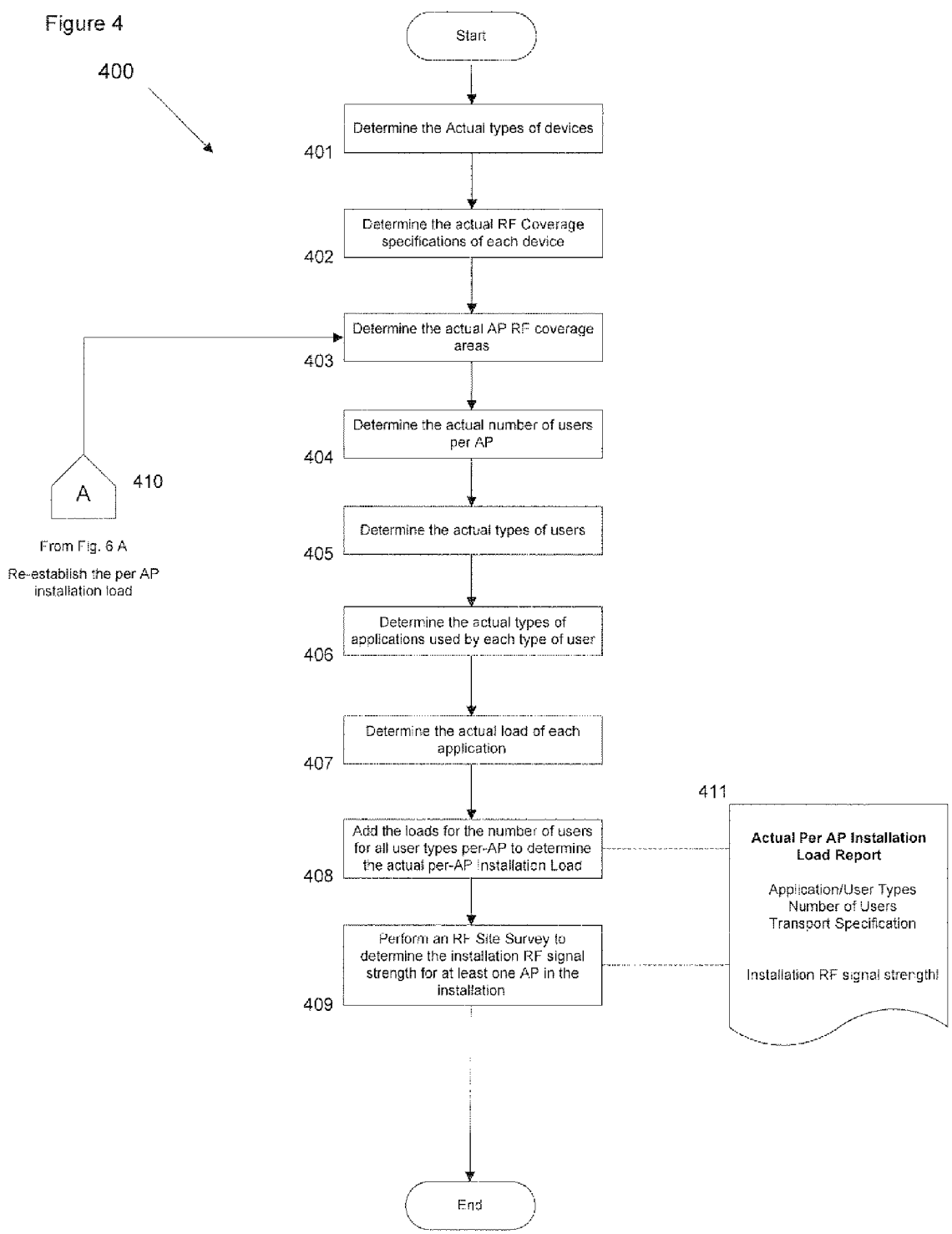

Figure 4A

| Location | Area | Peak rate (kbps) | | | Telemetry | Telemetry Alarm | Diagnostic Telemetry | Nurse Notifier | BCMA | Guest Access | EMR Images | EMR Numerics | E-mail | Infusion Pump status | Infusion Pump alert | VoIP | Peak BW (Mbps) | APs based on area | BW per AP (Mbps) | Totals |
|---|---|---|---|---|---|---|---|---|---|---|---|---|---|---|---|---|---|---|---|---|
| | | Patients | Nurses | Staff | 12.5 | 1 | 25 | 25 | 12.5 | 0.8 | 1000 | 4000 | 48 | 4000 | 1 | 1 | 83 | | | |
| | | | | | Peak Number of Applications in Each Area | | | | | | | | | | | | | | | |
| ED | 10,000 | 25 | 4 | 4 | 25 | 6 | 0 | 2 | 2 | 0 | 3 | 2 | 13 | 3 | 3 | 3 | 21 | 4 | 5 |
| Surgical | 20,000 | 6 | 6 | 6 | 0 | 2 | 6 | 1 | 2 | 0 | 1 | 0 | 6 | 1 | 4 | 4 | 17 | 9 | 2 |
| PACU | 8,000 | 10 | 5 | 2 | 10 | 3 | 0 | 1 | 2 | 0 | 1 | 1 | 5 | 1 | 3 | 3 | 12 | 3 | 4 |
| Med-Surge | 30,000 | 40 | 7 | 6 | 5 | 1 | 0 | 1 | 3 | 10 | 4 | 3 | 20 | 4 | 4 | 4 | 39 | 13 | 3 |
| Peds | 15,000 | 20 | 4 | 3 | 3 | 1 | 0 | 1 | 2 | 5 | 2 | 2 | 10 | 2 | 2 | 3 | 21 | 6 | 4 |
| OB | 18,000 | 20 | 7 | 5 | 5 | 1 | 0 | 1 | 3 | 5 | 2 | 2 | 10 | 2 | 2 | 4 | 26 | 8 | 3 |
| Intensive Care | 10,000 | 8 | 4 | 2 | 0 | 2 | 8 | 1 | 2 | 2 | 1 | 1 | 4 | 1 | 1 | 2 | 14 | 4 | 4 |
| Special Procedures | 10,000 | 8 | 4 | 2 | 8 | 2 | 0 | 1 | 2 | 0 | 1 | 1 | 8 | 2 | 2 | 2 | 12 | 4 | 3 |
| Radiology | 9,000 | 4 | 0 | 4 | 4 | 1 | 0 | 1 | 0 | 0 | 1 | 0 | 2 | 1 | 1 | 2 | 8 | 4 | 2 |
| Cath Lab | 15,000 | 3 | 3 | 2 | 0 | 2 | 8 | 1 | 1 | 0 | 1 | 0 | 3 | 1 | 0 | 2 | 8 | 6 | 1 |
| Physician's Lounge | 1,500 | 0 | 0 | 0 | 0 | 0 | 0 | 0 | 0 | 0 | 4 | 4 | 0 | 4 | 0 | 4 | 33 | 1 | 33 |
| Other Lounges | 7,500 | 0 | 0 | 0 | 0 | 0 | 0 | 5 | 5 | 5 | 1 | 0 | 0 | 5 | 0 | 5 | 29 | 3 | 10 |
| Other Areas | 30,000 | 0 | 0 | 60 | 0 | 0 | 0 | 4 | 4 | 0 | 0 | 0 | 0 | 6 | 0 | 10 | 25 | 13 | 2 |

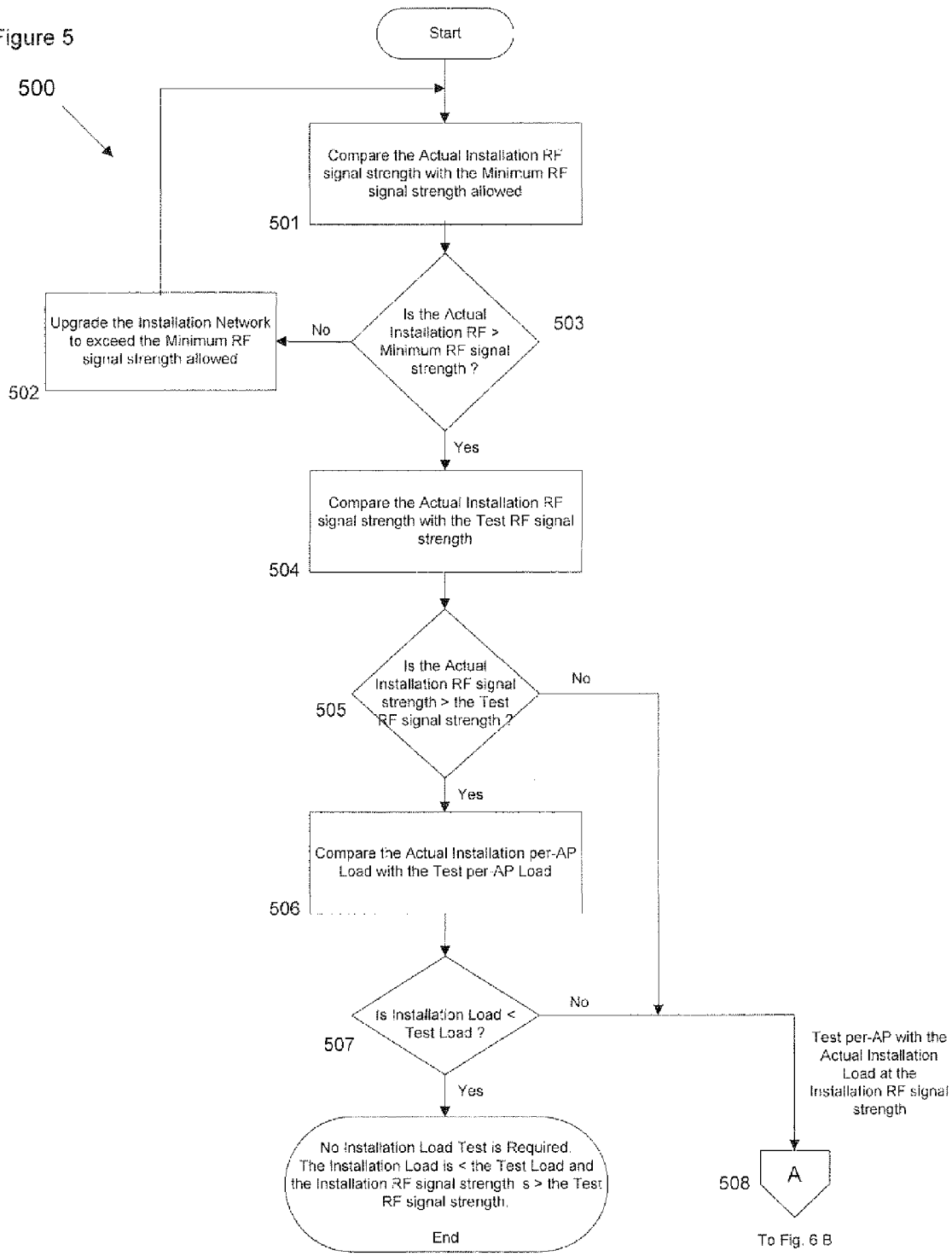

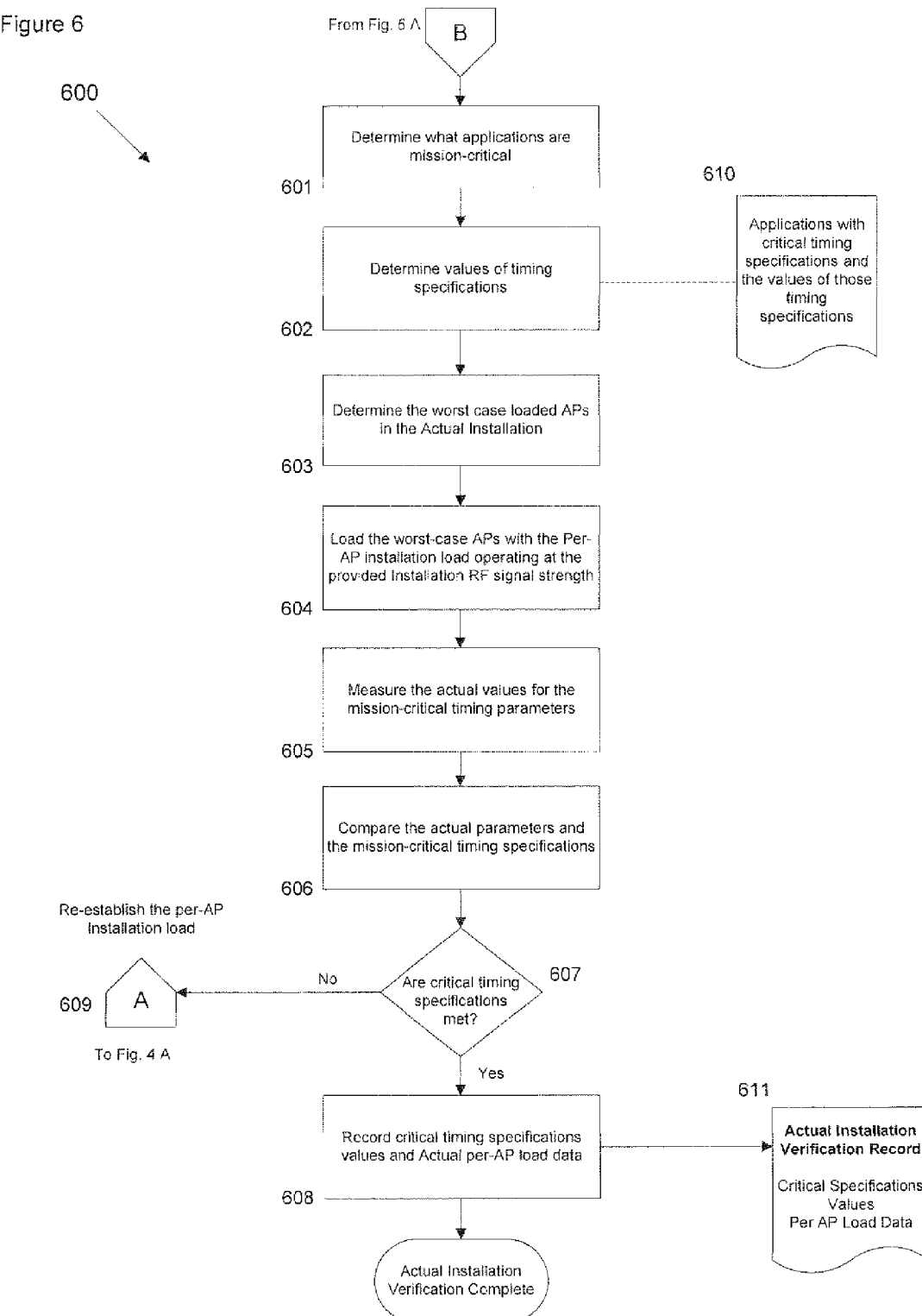

US 7,738,386 B2

METHOD TO ENSURE THAT LIFE-CRITICAL DATA IS TRANSPORTED EFFECTIVELY AND SAFELY

FIELD OF THE INVENTION

This invention relates generally to mission-critical data delivery on shared networks, and more particularly, to life-critical delivery of patient information to a central monitor and clinicians across 802.3 LANs and 802.11 Wireless LANs. Specifically, this invention relates to a method for qualifying a computer network to ensure reliable data transport of life-critical data, and more particularly, to a process that analyzes the network load of a healthcare provider's wireless infrastructure, verifies that network latency levels are sufficiently minimal for reliable data transfer, and validates that radio frequency (RF) signal strength in all coverage areas is adequate, all providing for the safe and effective transport of medical data across the network.

BACKGROUND OF THE INVENTION

Vintage analog medical telemetry from the 1970s exhibited a typical maximum data loss of 50 minutes per day, an enormous improvement over no patient monitoring. The initial digital systems stumbled as they exhibited 75 minutes per day of lost data. Over time improvements were made but second generation UHF telemetry still exhibited 25 minutes of dropout per day. This included most systems running in the Wireless Medical Telemetry Service (WMTS).

The medical world received a wakeup call when a High Definition Television (HDTV) station test near Baylor Hospital impacted patient telemetry. If a digital television station transmits in the same channel as UHF telemetry, virtually no data are transmitted successfully, which is why the Food and Drug Administration (FDA) and Association for the Advancement of Medical Instrumentation (AAMI) petitioned the Federal Communications Commission (FCC) for a band dedicated to medical telemetry, resulting in the WMTS. This allocation precludes a television station using the dedicated band, but does not result in any improvement over the 25 minutes per day of dropout.

Some companies have improved on second generation digital by copying the 802.11 Access Point (AP) concept, including using spread spectrum technology. As with any spread spectrum technology, the high ratio of available bandwidth to data bandwidth is important. With only 6 MHz available, these proprietary systems prefer to use the full 608-614 MHz band and therefore other medical telemetry systems are essentially rendered useless when operated nearby. Other WMTS solutions include re-crystalling existing systems. While this expensive "upgrade" removes the worry of an in-band HDTV station, it does nothing to improve the 25 minutes per day of dropout.

About the same time as WMTS was being considered in 1999, IEEE 802.11 was ratified and some medical device companies embraced the concept of standards-based solutions as a means to make better use of networks by sharing one network among many applications. At that time, the promise was unrealized because standards and protocols for security and quality of service had not yet been developed. Even so, using 802.11 for medical telemetry brought a 10-fold decrease in dropout [S. D. Baker, et al., "Performance Measure of ISM-Band and Conventional Telemetry," *IEEE EMB*, vol. 23, pp. 27-36m, May/June 2004] that is realized because of a robust modulation, intelligent communication protocols, and good radio frequency (RF) network design.

Since then, wireless Local Area Networks (LANs) have become ubiquitous in many industries and even within the cautious healthcare environment: nearly 50 percent of hospitals have 802.11 LANs installed and over 80 percent are planning to have an 802.11 network deployed to support Electronic Medical Records (EMR) within the next two years.

SUMMARY OF THE INVENTION

This invention comprises, in one form thereof, a method to ensure that a wireless network is installed, configured, and validated to provide safe and effective transport of mission-critical data across a wireless local area network. While the testing is developed for wireless networks, we note that it also may test the hardwired network on which the wireless network operates.

More particularly, the invention includes a method to verify the installation of a network to support mission-critical use by measuring network latency under expected network application load and determining if the latency meets the specification for each type of network application. The expected load is adjusted if specifications are not met. Further, the invention includes a method to pre-verify the operation of a wireless network for its intended use by measuring the timing parameters of mission-critical applications under a test network load and verifying that the test timing parameters meet the requirements for each application.

BRIEF DESCRIPTION OF THE DRAWINGS

The present invention is disclosed with reference to the accompanying drawings, wherein:

FIG. 4 is flow diagram of a process for establishing the expected load and radio frequency signal strength for an intended installation of a wireless network;

FIG. 4A is a table illustrating application and data load as a function of area in a sample hospital installation;

FIG. 5 is a flow diagram of a process for comparing the intended installation's load and radio frequency signal strength with that of the test load and test radio frequency coverage level; and FIG. 6 is a flow diagram for a process that verifies the intended installation will support the transport of mission-critical data in the event that the installation's network load is greater than the test load, or in the event that the installation's radio frequency coverage level is less than the test radio frequency coverage level.

Corresponding reference characters indicate corresponding parts throughout the several views. The examples set out herein illustrate several embodiments of the invention but should not be construed as limiting the scope of the invention in any manner.

DETAILED DESCRIPTION OF A PREFERRED EMBODIMENT

Figure 1:
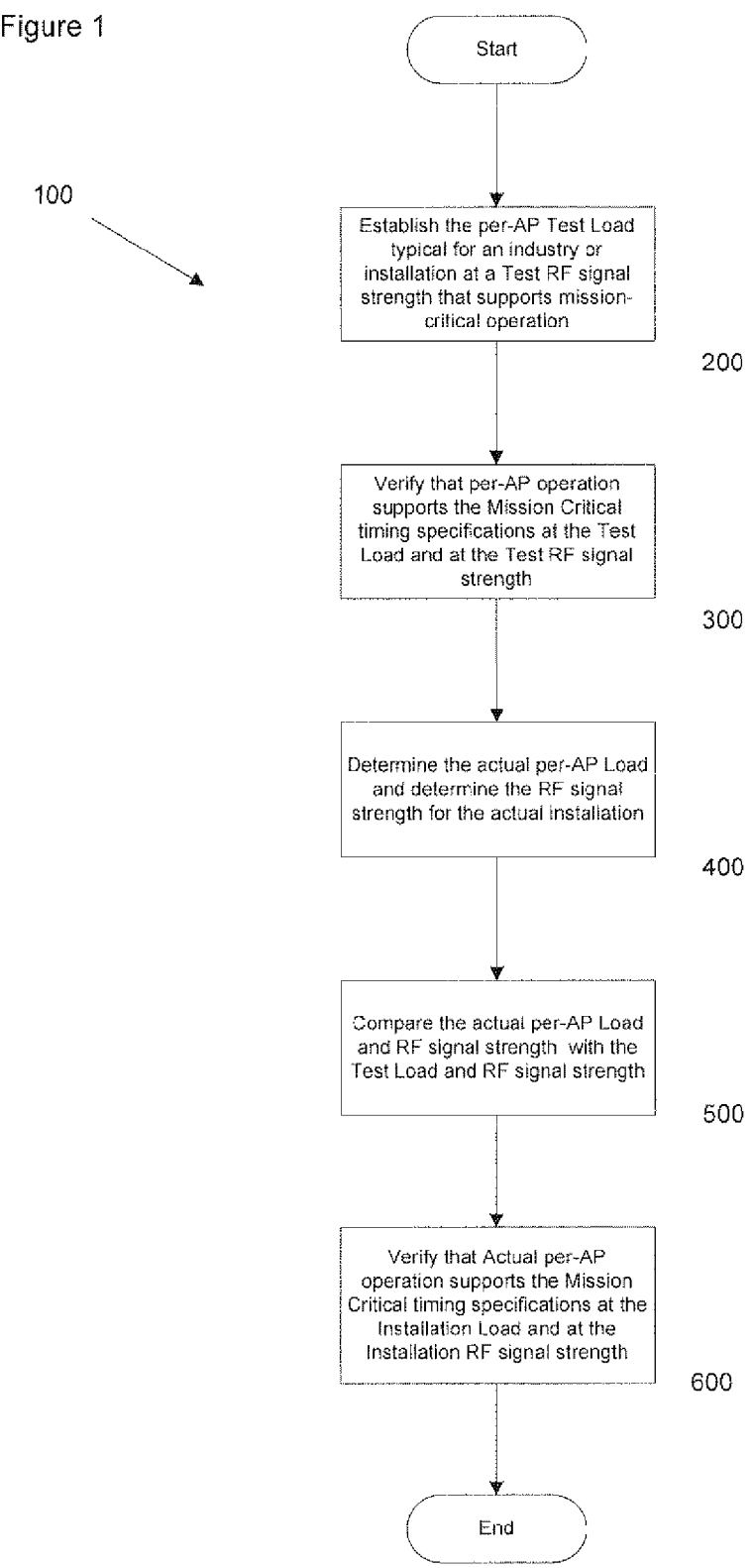
FIG. 1 is a flow diagram of one method to ensure effective and safe transport of mission-critical data.

Historically, biomedical and IT networks have run separately with the proprietary biomedical networks managed by the biomedical engineer in close cooperation with the medical device manufacturer. As these networks were not connected to the hospital backbone the medical device manufacturer could specify the network in any manner and typically had access to the network to monitor and/or trouble shoot. With shared 802.11 networks that support the enterprise, these solutions are no longer viable as the hospital IT departments understandably want to control their own network and are not disposed to giving outside access to these networks. Both network security and HIPAA compliance are issues.

Table 1 shows some of the network-communication applications in use in hospitals and a summary of what wireless solutions exist to support these applications on an enterprise scale. Note that 802.11g can be used without much issue at the unit or department level, but with only three channels, it is not well suited for enterprise installations. Still the concepts embodied in this patent pertain to 802.11g and 802.11b networks.

point operation of a mission-critical application on a test wireless network (steps 200 and 300) and producing a verification report, thereafter (2) comparing the tested load (disclosed in the report) to the actual load at a specific installation. (steps 400, 500, and 600). In this manner it is verified that the actual installation will support the mission-critical application. The test load includes a safety factor which is a number that is greater than or equal to 1. When the safety factor is equal to 1, the test load and the model load are the same. The usefulness of method 100 increases as more diverse types of applications and data share the same network.

As used in this specification, the term "model load" refers to a mathematical model load of at least one selected industry and may, or may not, include a safety factor. The term "test load" refers to the modification of a model load such that a

TABLE 1

Wireless solutions and Applications

|  | 802.11a | 802.11g | Cellular | Paging | PLMR | WMTS | MICS |
|---|---|---|---|---|---|---|---|
| Nurse Call | ● |  |  | ● |  |  |  |
| Voice | ● |  | ● |  | ●[1] |  |  |
| Telemetry | ● |  |  |  | ●[1] | ● |  |
| Clinician | ● |  | ● |  |  |  |  |
| Notifier |  |  |  |  |  |  |  |
| BCMA | ● | ● |  |  |  |  |  |
| Remote Access | ● | ● | ● |  |  |  |  |
| Guest Access | ● | ● |  |  |  |  |  |
| EMR | ● | ● |  |  |  |  |  |
| Streaming Video[2] | ● | ● |  |  |  |  |  |
| E-mail | ● | ● | ● |  |  |  |  |
| Location | ● | ● | ●[3] |  |  |  |  |
| Cart on Wheels | ● | ● |  |  |  |  |  |
| Emergency Backup | ●[4] |  |  |  |  | ●[1] |  |
| Implanted Device |  |  |  |  |  |  | ● |
| Patient Billing | ● | ● |  |  |  |  |  |

[1]Since PLMR (Private Land Mobile Radio) does not use a network, it is a good emergency backup, but communication across the enterprise is not guaranteed. Private calls are not supported.
[2]VGA resolution at 30 frames per second or better.
[3]Outdoor location only - indoor GPS service is not dependable because S-Band doesn't penetrate through floors and walls well.
[4]With redundant installation and backup power installed.

What is provided is a method to ensure that a wireless network is installed, configured, and validated to provide complete, effective, and safe operation for a wide variety of applications sharing the wireless network at a service level acceptable to all applications and users comprising the expected load. This requires a method to measure the network latency for mission-critical patient and alarm data applications while operating with an expected aggregate user application load to determine if that latency is acceptable and provides for safe and effective transport of the data across the wireless LAN. Also provided is a method to then validate the wireless network installation under an actual application load such that radio frequency signal strength coverage requirements are met over the full radio frequency coverage area, and that data is transferred effectively and completely, with no unacceptable latency, loss, or corruption of the data for all devices which will carry mission-critical data across the wireless network.

Referring to FIG. 1, the method 100 to validate that mission-critical data can be reliably transported across a wireless LAN is a two-phased process comprising the steps of (1) creating a model for the intended industry and from this model, creating a test load that is used to verify the per-access safety factor is included. The term "actual load" refers to the load of a specific installation site, such as the load at a particular medical facility.

Verification of a Test Load at a Test RF Coverage Level for Intended Use

Referring again to FIG. 1, the verification of the operation of a wireless network installation for its intended use starts with step 200, wherein the per-access point test load and test signal strength for an industry or installation is established. Step 200 is illustrated in greater detail in FIG. 2. Throughout the examples provided in this description the medical industry or hospital industry is put forth as the industry of choice. It should be appreciated that the process of the invention is equally applicable to other industries. The term "industry" refers to a group of users who are related such that their web access needs are to interact. This group of users could be related by location (e.g., all in the same airport), by their field of work (e.g., all for the same industry), or geographic location (e.g., all in the same building).

Figure 2:
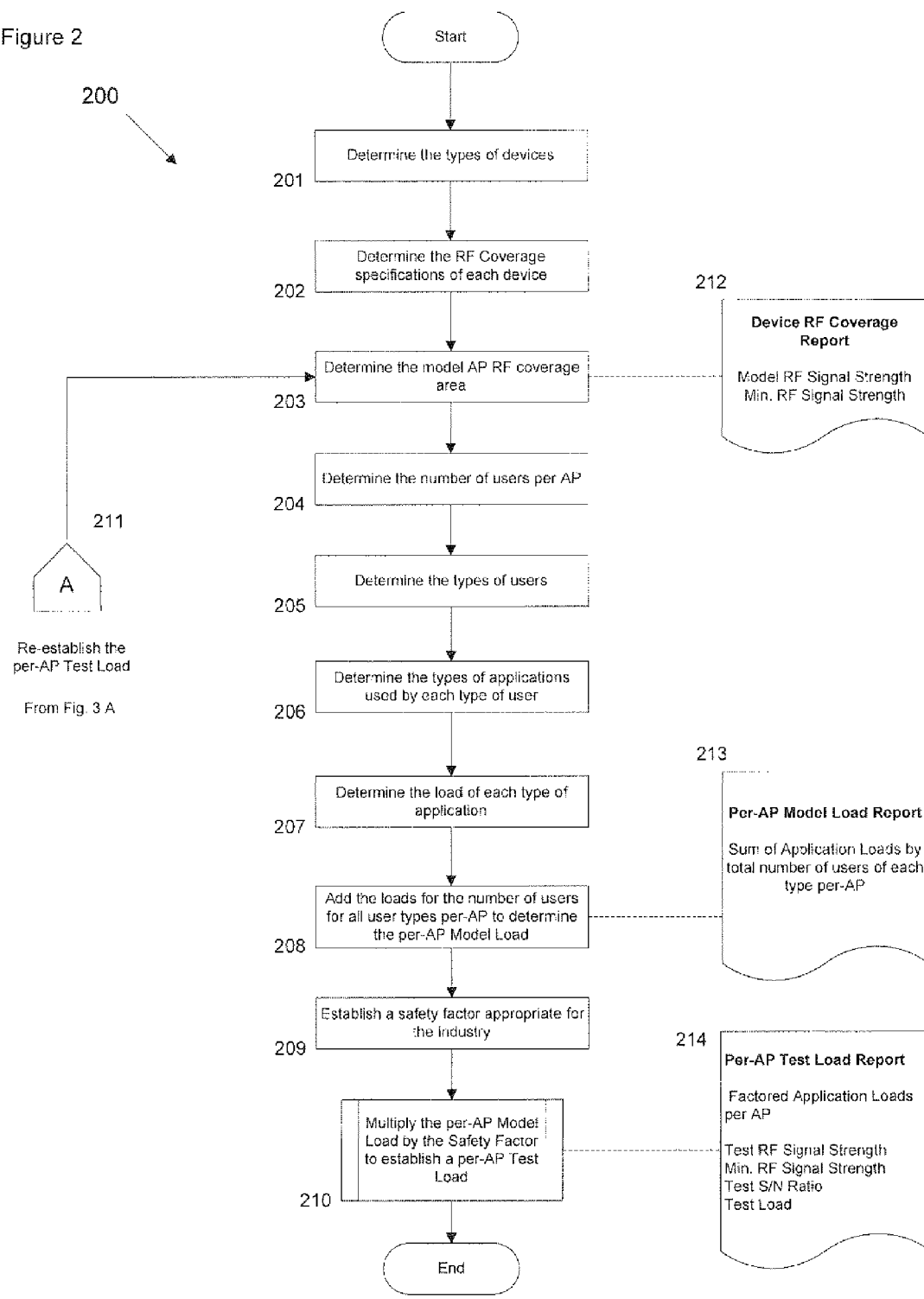
FIG. 2 is a flow diagram of a process to establish the test load at a test radio frequency signal strength.

FIG. 2 shows one process of step 200 of FIG. 1 for establishing the per-access point model load and model signal strength in a model network and reporting such in report 213. This model load is augmented by a safety factor to establish the test load and results in the per-AP test load report 214, and it is the test load which is used for subsequent verification. In one embodiment, the test load includes a test signal to noise ratio. An industry which utilizes a wireless network is examined to determine the network parameters which are likely to be found within the industry. Such an examination may be conducted by survey, by contacting network domain experts that work in the industry, or by other appropriate means. When determining the properties for the chosen industry, it is preferred to project the worst-case-scenario. For example, when the hospital industry is at issue, the industry may be examined by survey, and the properties are selected to simulate a large hospital, rather than merely a small or a typical hospital. As another example, wireless VoIP telephones require a higher RF signal strength than do laptops which typically support e-mail and file transfer.

In the embodiment depicted in FIG. 2, process 200 is initiated by executing step 201, wherein the types of devices used by the Wireless Local Area Network (WLAN) is determined. Within the medical industry, the types of devices that are in use today include, for example, computers, laptop computers, PDAs, VoIP—cellular phones, infusion pumps, patient monitors, and the like, all with embedded 802.11 radios. Each of these devices may host one or more types of applications. Many types of healthcare applications and devices are listed in Table 1. The particular devices and applications at issue are typically determined through a survey or are provided by a domain expert. We note that this process is not restricted to 802.11 networks, but may be applied to other networks which may be developed, including cellular-based approaches in 802.16 WMAN (Wireless Metropolitan Area Networks), and in some WMTS solutions such as PatientNet developed by VitalCom.

In step 202, the RF coverage specifications for each type of device are determined. Coverage specifications include parameters such as signal strength and signal-to-noise ratio (SNR). For example, wireless VoIP phones typically require a signal strength of −65 to −67 dBm and a signal-to-noise ratio (SNR) of 25 dB. Typically, the most demanding type of device is used to define the RF coverage specifications, but multiple test networks can be used with different requirements. This may be the case where a portion of the WLAN supports wireless VoIP, but other areas do not. Medical monitors such as the Propaq LT, Propaq CS, and Micropaq, as provided by Welch Allyn, typically specify a signal strength of −65 dBm, SNR of 15 dB, and redundant coverage. Redundant coverage means that all areas are covered by at least 2 APs and this solution allows reliable RF transmission when RF shadowing by the human body occurs or when physical conditions change, such as adding walls or changing storage locations.

In step 203, the model RF coverage area that the access point will support is determined. As is customary in the art, the term coverage area refers to the volume of space surrounding an access point wherein a device may connect to the network, although it is often treated as an area. The industry is examined to determine the value of an appropriate coverage area. Using network tools, such as those available from Ekahau or AirMagnet, one can model RF propagation to determine the coverage area that corresponds to a certain signal strength and also the SNR. For example, for −65 dBm, a coverage radius of about 70 feet is typical (corresponding to a coverage area of about 15,400 square feet). The quantity of any single type of application that can be operating on a single access point at any given time is related to the area covered by the RF signal and the number of users of that application that can be in the vicinity of the access point, where the RF signal strength meets the specifications of step 202.

Report 212 is established during the execution of step 203. Report 212 contains device and/or application coverage specifications. Report 212 is established such that the specifications of the most demanding type of device are specified. Report 212 includes both the minimal specifications necessary to satisfy the most demanding device as well as the desired specifications to preferably operate the device with confidence. By way of illustration, and not limitation, for a Propaq LT patient monitor, the report 212 may specify a coverage level of −65 dBm and an SNR of 15 dB, yet actually work to a coverage level of −75 dBm and a SNR of 10 dB. Typically, a manufacturer builds in a safety factor, known as a link margin, to ensure that the RF channel is robust. A business may decide to operate with a smaller link margin than the manufacturer recommends, saving on installation costs, but does so at the expense of reliability.

In step 204 the number of users per access point is determined, using the model RF coverage area (determined in step 203). For example, consider access point spacing at 60 feet in the case of a wireless patient monitoring application that requires a RF signal strength of −65 dBm. A patient will always be within 30 feet of an access point. This results in about 2800 square feet of coverage area per-access point. In the instant example, and based upon the examination of the medical industry discussed above, it is reasonable, in this example, to assume 250 square feet per patient room or lab (including hallways) for a reasonable worse-case scenario. Based on this examination, it could be determined that there are (worst-case) 11 patients per-access point in the medical industry. Similarly, for redundant RF coverage, with closer access point spacing of 50 feet, we have 1962 square feet of coverage area and 8 patients per access point. In the last case, with 1 clinician for every 2 patients (which is determined by examining the general industry), then we have 4 clinicians and 8 patients per-access point. If an access point fails, about half will go to each nearest neighbor, leaving each with 12 patients and 6 clinicians. This is an example where including a safety factor is prudent. In a hospital, typical use of an access point may be determined to be 10% of nurses on the phone, 20% EMR access, 20% patient monitoring, and 10% e-mail. Since different areas of the hospital likely have different usage rates, specifically for patient monitoring where some devices monitor 100% of patients and others monitor no patients, different models may be appropriate for a given sub-industry.

In step 205, the types of users that will be sharing the WLAN are determined. Again, consulting an expert or performing surveys is a method to acquire this information. For example, a survey could yield the following per access point user distribution: 5 physicians, 15 patient monitors, 10 guest access users, 3 nurses, and 4 staff users. Staff covers orderlies, technicians, and medical assistants who have similar wireless LAN usage characteristics. If physicians and nurses have the same wireless LAN usage characteristics, they may be grouped together as "clinicians" to keep the model simple. A more in-depth survey would also provide statistics for each user type including peak and average use. These statistics are used to determine a realistic "worst case" configuration, which is used in step 207. That is, it is unlikely that all users have simultaneous peak bandwidth requirements. Since different types of users often utilize certain types of applications, it may be desirable to calculate the usage of applications based on the number of users of a given type, so that the usage model is more specific than simply 80 kbps. For example, 80 kbps is typical for a VoIP connection and this consumes substantially more airtime than does file transfer with an average use of 80 kbps. This is because the VoIP connection consists of a large number of small packets and the file transfer typically uses larger packets. Since each packet transmitted has an associated network overhead, transmitting multiple smaller packets adds more network burden than the same number of bytes transmitted in large packets. Typical WLAN users in a hospital include doctors, nurses, staff, and guests. Guest users include visiting physicians, patients, and their families. Some staff may perform data entry regarding their patients. In other embodiments, the type of user is not determined. Instead, the number of applications of a given type that are likely to be open at a given time is directly determined.

In step 206, the types of applications that will be used on the wireless network by each type of user identified in step 205 are determined either by survey, consulting a domain expert, or other method. Within the medical industry, typical types of applications include, for example, nurse call software, patient monitoring software, e-mail software, patient billing software, and remote access software. Many other typical healthcare applications are listed in Table 1.

In step 207, for each type of application that will be utilized on the model wireless network, the load of each of these application types is determined. This information can be obtained through network analysis tools (such as Airopeak and Ethereal), by survey, by researching manufacturer's specifications, or other methods. Examples of load data are provided in Table 2. For streaming data, peak and average values are the same values. For intermittent data, such as routine vital signs taken on all patients every 4 hours, peak and average are widely different. Values less than 0.1 kbps are listed at 0.1 kbps. Packets per second and bits per packet are averages for guest access, e-mail, etc. Latency is the latency allowed by the application, and therefore is an end-to-end value.

TABLE 2

Load Data Characteristics per Application

| | Packets per sec | kbits per Packet | Peak (kbps) | Avg (kbps) | Events/Hr or Duty Cycle | Latency (max, ms) |
|---|---|---|---|---|---|---|
| Wireless VoIP (telephone) | 28 | 3 | 85 | 85 | Stream | 50 |
| Telemetry | 5 | 2.5 | 12.5 | 12.5 | Stream | 200 |
| Diagnostic | 5 | 5 | 25 | 25 | Stream | 200 |
| Alarms | 5 | 1 | 1 | 0.1 | 10/hr | |
| Clinician Notifier | 5 | 2.5 | 12.5 | 0.1 | 20/hr | 200 |
| BCMA | 2 | 400 | 0.8 | 0.1 | 30/hr | 500 |
| Guest Access | 100 | 10 | 1000 | 30 | 3% | 1000 |
| EMR Images | 200 | 20 | 4000 | 40 | 1% | 200 |
| Numerics | 4 | 12 | 48 | 0.1 | 40/hr | 200 |
| E-mail | 200 | 20 | 4000 | 40 | 1% | 200 |
| Infusion Pump | | | | | | |
| Status | 1 | 1 | 1 | 1 | Continuous | 200 |
| Alert | 1 | 1 | 1 | 0.1 | 1/hr | 200 |

In step 208, the per-access point model load report 213 is established by adding together all of the application loads for the total number of each type of user that operates applications in a single access point's RF coverage area. In one embodiment, a "worst-case" access point is established which is appropriate to the industry at issue. The total load on such an access point is determined by summing the load for each application associated with the access point, and multiplying by the number of users of the same access point. For example, our survey in previous steps indicates 5 physicians, 3 nurses, 4 staff user, 15 patients and 10 guest access users. Physicians require wireless VoIP, E-mail, and EMR Image and numeric access. However, we also noted that the peak use is actually 1 physician using each of these applications so the peak load due physicians is 1*85 kbps+1*4000 kbps+1*4000 kbps+1*48 kbps=8133 kbps. Nurses require Wireless VoIP, Clinician Notifier, BCMA, EMR Numerics and e-mail. In the peak use analysis, we found that, at most, one VoIP call and one e-mail access is used at a given time, so the load due to nurses is 1*85 kbps+3*12.5 kbps+3*0.8 kbps+3*48 kbps+1*4000 kbps=4268.9 kbps. Staff users require BCMA and EMR numerics, but at most 2 EMR numerics are taken at a given time, and BCMA and EMR numerics are taken sequentially (never at the same time) so the load due to staff users is 2*0.8 kbps+2*48 kbps=97.6 kbps. In peak use, all patients have telemetry and an infusion pump, but alarms and alerts only occur on 20% of the patients at any time. The load due to patients is then 15*12.5+20%*15*1+15*1+20%*15*1=208.5 kbps. The 10 guest access users at peak will use any and all bandwidth available, but a cap of 1 Mbps (1000 kbps) is in place so the load due to guest access users is 1000 kbps.

In step 209, a safety factor is established. The test load (discussed below) includes this safety factor that allows a safety margin to be factored into the per-access point model load, resulting in a per-access point test load. This will increase the confidence when the test load is later compared to an actual installation load and also provides margin in the event of AP failure.

In step 210, the per-access point model load is multiplied by this safety factor. In one embodiment, this safety factor is a number from one (no additional margin) to two (double the margin). The safety factor would typically be one in administrative areas where no mission-critical/life-critical data transactions occur, and two where a high number of life critical data transactions occur. A safety factor can also be put in place for the RF link-margin. For example, the minimum requirement is −75 dBm, but a network system may be installed for −65 dBm to account for multi-path signals, RF shadows, and a changing RF environment. On the trading floor of the NY Stock Exchange, the traders might consider every trade mission critical and therefore a safety factor of two is appropriate. We note that timing specifications are one method of many to provide a measure of network performance. Telephony, including wireless VoIP uses a Mean Opinion Score (MOS), which is essentially an average of user-opinions of the voice quality of the call. The timing specification of latency <50 ms for VoIP is actually a derived specification, based on an acceptable MOS. Other examples of performance specification or metrics could include: no under-run on the buffer for streaming media, average throughput, peak throughput, number of users supported, number of applications supported, roaming time, security levels such as WPA2, user-satisfaction surveys (MOS is a specific example of a satisfaction survey), number of transmission retries, number of lost packets, or similar metrics known to those familiar with the art. Execution of step 210 results in per-access point test load report 214. This test load then serves as the baseline for comparison to a test WLAN (see FIG. 3). The coverage area is one of the factors that determine the test load. For example, the number of users (per access point) of mission-critical applications that are serviced is reduced (and the per-access point model load is decreased)

by decreasing the coverage area. Other suitable methods for altering the model load would become apparent to one skilled in the art after benefiting from reading this specification.

Figure 3:
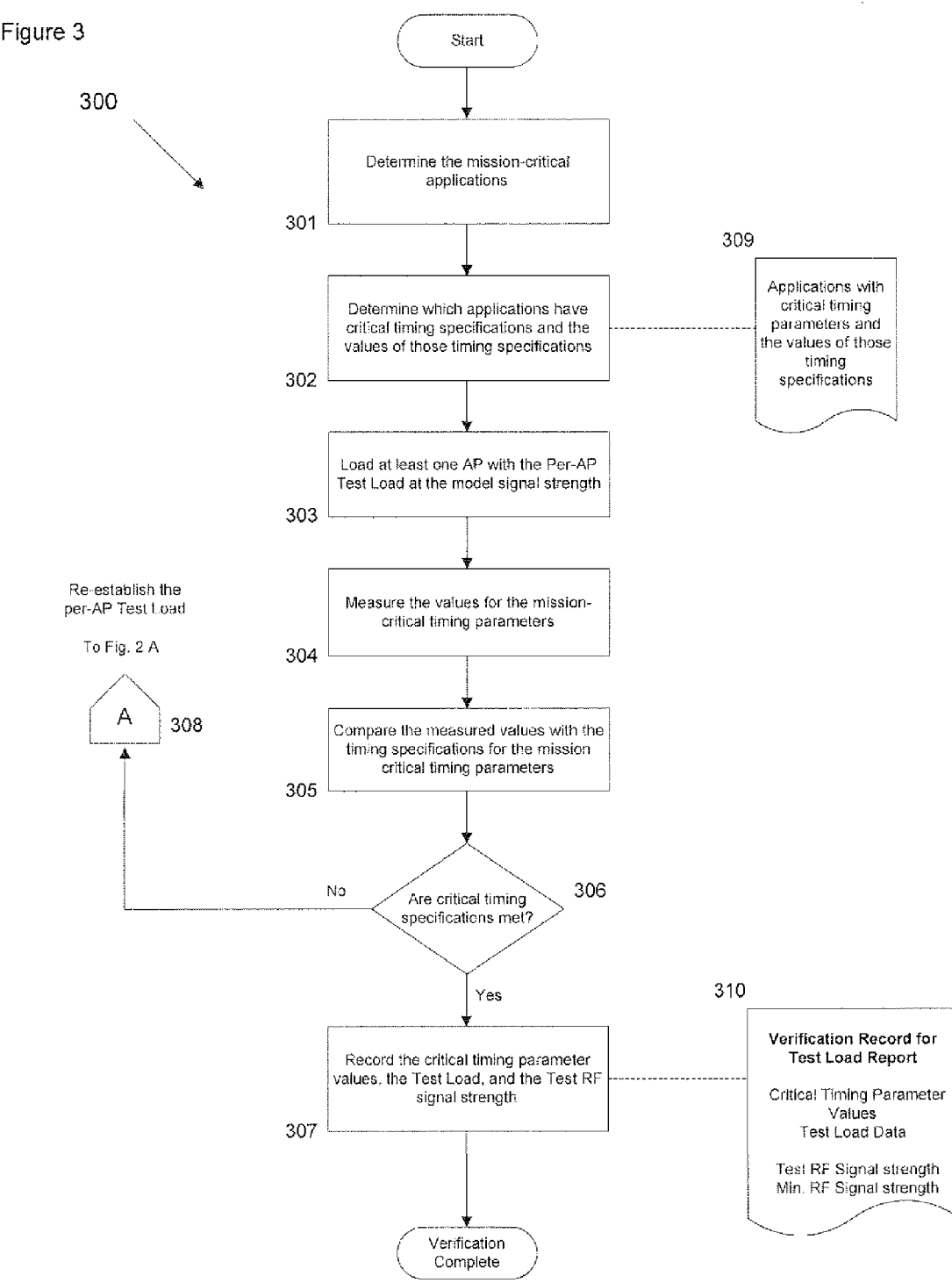
FIG. 3 is a flow diagram of a process for the pre-verification of the test load at the test radio frequency signal strength.

FIG. 3 describes the process 300 for verifying that the timing specifications of the mission-critical applications are supported by operating an access point at the test load (see report 214) at the test RF signal strength (see report 214). Testing at the test RF signal strength provides a worst-case environment for retries and low data rates.

Referring now to FIG. 3, and to process 300 depicted therein, in step 301, application types (see step 206) are analyzed to determine which applications are mission-critical. Within the hospital industry, application types include, for example, e-mail software, word processing software, VoIP software, medical record tracking software, medical monitoring software, alarm software, infusion pump software, HL7 software, financial software, and the like. At a given hospital (i.e. installation) it may be determined that medical monitoring software, alarm software, and VoIP software are mission-critical. The remaining types of applications are designated non-critical. In other embodiments, alternative or additional applications are designated as mission-critical applications.

In 302, we determine the timing specifications for each type of application (from step 206). As used in this specification, the phrase "timing specifications" refers to the timing parameters defined by an industry or manufacturer recommended for an application or device to function properly. For example, the VoIP industry accepts 50 ms as the maximum latency and maximum jitter acceptable for a voice packet. In medical telemetry one manufacturer buffers data and sends it in packets, allowing 400 ms of latency. Another manufacturer does not buffer data, but sends every data sample separately, every 25 ms. If a sample is delayed past when the next sample arrives, that delayed sample is assumed lost and ignored by the central station. The manufacturer indicates that at most 10 samples can be lost before a clinically significant amount of data loss occurs. Together, this implies a maximum delay of 250 ms is acceptable. The union of the outputs of 301 and 302 is record 309, which contains a list of mission-critical applications and corresponding timing specifications. Nurse call, clinician alarm notification, voice applications utilized by clinicians and physicians, location technology, infusion pumps, and patient vital signs monitoring are examples of mission-critical applications which require a minimal network latency and bandwidth providing for acceptable levels of latency and loss of data. Applications such as e-mail, medical record keeping and visualization of medical imaging are not required by their users to have an immediate response and can be subject to larger delays in the transmission of their data. Other applications, such as non-emergency wireless VoIP, may not be mission-critical in that cellular or desk telephones are available, but VoIP and its 50 ms latency limit would be part of the preferred set of non-critical applications.

Record 309, which contains a list of the mission-critical applications and their corresponding timing specifications, is used during the execution of step 305 (discussed elsewhere in this specification). Wireless VoIP phones typically have specifications that include a signal strength of −65 to −67 dBm, a signal-to-noise ratio of 25 dB, and a latency of less than 50 ms. Latency for VoIP applications preferably does not exceed 50 ms in order to maintain good voice quality communications and reliable clinician communications. Patient monitoring applications preferably have less than 1 minute of dropout per day for 802.11 patient telemetry at latencies of 200 ms maximum. With the critical timing specifications determined from step 301 and step 302, the verification continues with the execution of step 303.

In step 303, an access point is loaded with the per-access point test load (from report 214) at the test RF signal strength (from report 214). Network performance tools, such as IxChariot by Ixia, are designed to test a wireless access point while it is loaded with such a test load. Such network performance tools can statistically simulate VoIP traffic, ftp file transfers, streaming audio and video, e-mail, web browser transactions, and the like. For example, an access point may be loaded as indicated in Table 3. Such a network performance tool allows a statistical distribution of the period between data transfer events that can be used to create random occurrences of data transmission. Because each data transmission type has a random time interval since the previous, sometimes all the data occurs at once and sometimes there is no data transmitted, but typically there is some overlap, just as in the real world. We note that other methods of creating model loads, including actual data transmissions may be used.

TABLE 3

Types of Access Point Loads

| Type | # loads | File size (bytes) | Once every: | Data rate | Quality of Service |
|---|---|---|---|---|---|
| HTTP | 2 | 100k, 500k | 5 to 120 sec. | 10 Mbps | Best effort |
| HTTP | 6 | 3k, 5k, 10k, 30k, 50k, 100k | 1 to 30 sec. | 10 Mbps | Best effort |
| Exchange email Transmit | 2 | 1k, 50k | 2 to 60 sec. | 10 Mbps | Best effort |
| Exchange email Receive | 1 | 1k, 50k | 2 to 60 sec. | 10 Mbps | Best effort |
| Streaming Audio | 2 | n/a | Streaming | 80.736 kbps | Best effort |
| Video (2 way) | 1 | n/a | Streaming | 2.05 Mbps | AC_VI |
| Video (1 way) | 1 | n/a | Streaming | 1.2 Mbps | AC_VI |
| VoIP | 3 | n/a | Streaming | 85 kbps | AC_VO |

In step 304, while the access point is operating under the per-access point test load, the timing parameters of the mission-critical applications are quantitatively measured by the network performance tool. These timing parameters correspond to the timing specifications which are to be satisfied. For some devices, roaming is an essential part of the operation. In this case, there are at least two access points and during the test, the devices are forced to roam from one access point to another. Preferably, both access points run at the per-access point test load. The measured timing parameters that are measured in step 304 are then compared to the desired timing specifications (from record 309) in step 305.

In step 305, a comparison is made between the measured timing parameters (from step 304) and the desired timing specifications (in record 309). The result of this comparison is analyzed in step 306. If the critical timing specifications are met for the test load operating at the test RF signal strength, then the mission-critical applications have been verified to operate at the per-access point test load on the access point using the test signal strength. In step 307, the mission-critical timing specifications and their measured values from the per-access point test load at the test RF signal strength are recorded in verification report 310.

Step 308 is executed if the critical timing specifications are not met (determined in step 306). In step 308 the per-access point test load and/or the test signal strength is re-established to present a new per-access point test load to the access point which will allow for the mission-critical timing specifications to be met. In one embodiment, the test load is re-established by reducing the size of the test access point RF coverage area. In this manner the number of users (per access point) of mission-critical applications that are serviced is reduced and the per-access point test load is decreased. With a higher density of access points (and constant radio transmit power), the number of devices supported by each access point is decreased and the RE signal is stronger. Together, these provide a higher probability that the mission-critical timing specifications are met for the re-established per-access point test load. To produce a smaller access point coverage area, one can decrease the access point's transmit power. This has the effect of reducing the number and types of users that are included in the per-access point RF coverage area, and decreasing the per-access point load, thus increasing the probability that the mission-critical specification values for that test load are supported. This solution does not result in a higher RF signal strength, but does decrease the RF background noise that other access points see and is usually preferable to a dense access point deployment with high-powered access point transmitters. Once the test load has been re-established, step 203 (see FIG. 2) is then executed. By returning to step 203, the re-established per-access point test load is re-analyzed to verify it will support the mission-critical applications. We note an alternative method for restricting the number of users. Some 802.11 solutions, such as that provided by Aruba Wireless Networks, provide the ability to restrict the number of users and/or the number of a specific type of application, such as VoIP, on a particular AP or group of APs.

After the test load is re-established, then the verification that the per-access point test operation meets the mission-critical timing specifications at the newly re-established per-access point test load are, once again, carried out as depicted in FIG. 3. Should the re-established per-access point test load still fail to support the mission-critical applications, this process is repeated until all critical timing specifications are met and the verification report 310 for the test load can be established.

Verification to Support Mission-Critical Application in an Actual Installation

After establishing a verification report 310 for an industry, the second phase of the method to ensure mission-critical data transport (FIG. 1—steps 400, 500, 600 and FIGS. 4, 5, and 6) may be conducted. This second stage is comprised of the steps of determining the actual per-access point installation load and the actual RF signal strength for a specific intended installation (FIG. 4), comparing the actual load found at the installation site to the test load and test signal strength found in the verification report 310 (FIG. 5). In an alternate embodiment, actual signal to noise ratio is also determined. If necessary, one can verify that the installation supports the actual installation load by executing sub-process 600 (FIG. 6). Sub-process 600 is executed if step 505 and/or step 507 produce a "no" response, indicating that the modeled performance is less than the desired performance. If such a "no" response is not produced, then sub-process 600 is preferably omitted. Advantageously, an industry operator, such as a hospital network administrator, can review report 310 and compare the specifications therein to the hospital's network. In this manner, the administrator can verify that the hospital's network can support the mission-critical applications and/or devices without needing to contact the manufacturer of the applications. In one embodiment, the devices, which run the mission-critical applications, are provided to the hospital along with verification report 310.

Referring now to FIG. 4, the verification that the per-access point operation of an actual wireless network installation supports the mission-critical timing specifications of the intended applications, starts with determining the actual per-access point load and actual signal strength for the actual installation. FIG. 4 is a flow diagram for such a process 400. Process 400 mirrors process 200, but replaces test values with actual values from the specific installation at issue.

In step 401 of sub-process 400 the actual types of devices that are connected to the actual WLAN are determined. Within the medical industry, the types of devices that are in use today to operate these typical applications include computers, laptop computers, PDAs, VoIP—cellular phones, infusion pumps, and patient monitors, all with embedded 802.11 radios. Other suitable wireless devices may also be used in conjunction with the teaching of this invention. Many healthcare applications and devices are listed in Table 1, and the actual devices and applications are typically determined through a survey or are provided by a domain expert. We note that this process is not restricted to 802.11 networks, but may be applied to other networks which may be developed, including cellular-based approaches in 802.16 WMAN, and in some WMTS solutions such as PatientNet developed by VitalCom. The usefulness of this method increases as more diverse types of applications and data share the network.

In step 402, the actual RF coverage specifications for each type of device are determined. For example, wireless VoIP phones typically require a signal strength of −65 to −67 dBm and a signal-to-noise ratio of 25 dB. Typically, the most demanding type of device is used to define the RF coverage requirements in step 402. However, multiple installation networks can be used with different requirements. This may be the case where a portion of the WLAN supports wireless VoIP, but other areas do not.

In step 403, the actual RF coverage area that a single access point at the installation site will support is determined. Using network tools, such as those available from Ekahau or Air-Magnet, one can measure RF propagation to determine the coverage area that corresponds to a certain signal strength and also the SNR. For example, for −65 dBm, which support the 802.11a 54 Mbps data rate, a coverage radius of about 70 feet is typical. The quantity of any single type of application that can be operating on a single access point at any given time is related to the area covered by the RF signal from the access point and the number of users of that application that can associate with the access point.

In step 404, the actual number of users per access point is determined, using the actual RF coverage area (determined in step 403). For example, consider a hospital with access points spaced at 60 feet intervals that uses a wireless patient monitoring application that requires RF coverage at −65 dBm. A patient will always be within 30 feet of an access point. This results in about 2800 square feet of coverage area per-access point. Then in step 404, using the actual RF coverage area for the single access point (determined in step 403), the number of users of that access point is determined. For example, assuming 250 square feet per patient room or lab (including hallways), this is 11 patient monitors per-access point. Such assumptions may be based upon an examination of the particular installation site at issue. Similarly, for redundant RF coverage, with closer access point spacing of 50 feet, we have 1962 square feet of coverage area and 8 patients. In the last case, with 1 clinician for every 2 patients, then we have 4 clinicians and 8 patients per-access point. If an access point fails, about half will go to each nearest neighbors leaving each access point supporting 12 patients and 6 clinicians. In any given hospital, typical use may be determined by a survey to be, for example, 10% of nurses on the phone, 20% EMR access, 20% patient monitoring, and 10% e-mail. Since different areas of the hospital likely have different usage rates, specifically for patient monitoring where some units monitor 100% of patients and others monitor no patients, different models may be appropriate for a given industry or installation.

In step 405, the actual types of users that will be sharing the WLAN are determined. Again, consulting an expert or performing surveys is a method to acquire this information. Typical WLAN users in a hospital include doctors, nurses, staff, and guests. Staff is an umbrella category for medical assistants, orderlies, and technicians. Guest users include visiting physicians, patients, and their families. Some staff may perform data entry regarding their patients.

In step 406, the actual types of applications that will be used on the wireless network by each type of user identified in step 405 are determined either by survey, consulting a domain expert, or other method. Many typical healthcare applications are listed in Table 1.

In step 407, for each type of application that will be utilized on the wireless network, the actual load of each of these application types is determined. This information can be obtained through network analysis tools (such as Airopeak and Ethereal), by survey, by researching manufacturer's specifications, or other methods. FIG. 4A summarizes the application and data load as a function of area in a sample hospital installation. With modern construction, an 802.11a access point covers approximately 2800 square feet to a signal level of −65 dBm. This is about 90 percent of the coverage provided by 802.11g, and these numbers are used to obtain an estimate of (1) the number of access points per area, (2) the bandwidth requirements, and (3) the number of applications expected for a given access point location.

In step 408, the actual per-access point installation load report 411 is produced by adding together all of the application loads for the total number of each type of user that can be operating the applications in a single access point's RF coverage area. This results in a bandwidth per-access point, shown in the last column of FIG. 4A.

In step 409, the actual RF coverage of the installation is determined. To be confident that the test load will be supported by the actual access points, the RF signal strength in the actual installation is at least as good as specified in the report 310. This can be determined using Airmagnet, Ekahau, or a similar site survey tool. This actual RF signal strength is included with the specification of the actual per-access point installation load report 411.

Referring now to FIG. 5, with the actual per-access point load report 411 established for the intended installation, a comparison of the actual per-access point load report 411 and test load report 214 can be performed (500 and FIG. 5). Sub-process 500 is intended to determine if the actual installation load, as compared to the test load, can directly support the actual mission-critical timing specifications of the mission-critical applications. If process 500 cannot ensure that such mission-critical applications will be supported, then further verification of the actual installation load at the installation RF signal strength is performed (see process 600, FIG. 6) to guarantee support for mission-critical applications.

In step 501, the actual RF signal strength is compared to the minimum RF signal strength specified in test load report 214. Step 501 ensures the mission-critical device will at least satisfy these minimal requirements. In step 503, the results of this comparison are analyzed. Should the actual RF signal strength be less than the minimum desired, the actual installation network may be upgraded before continuing until it exceeds the minimum RF signal strength (step 502 is executed). In step 502, upgrading the installation network to meet certain minimum requirements can include reducing the access point spacing, increasing the transmit power of the installed access points, or some combination of both. Should the actual installation signal strength satisfy the requirements, then no modification is necessary and step 504 is executed.

In steps 504 and 505, the actual installation RF signal strength is compared to the test RF signal strength and the result of such comparison is analyzed. If the comparison is unfavorable, then the mission-critical application satisfies the minimal criteria (step 501) but fails to satisfy the more stringent test signal strength (step 504). As such, it is unclear if the actual application will operate properly—it meets the minimal specifications, but fails to satisfy the more rigorous test specifications. In such an event, further testing is then done in step 508. If the result of the analysis of step 505 is favorable, then one further comparison may be performed in steps 506 and 507.

In steps 506 and 507, the actual per-access point load is compared with the per-access point test load. If the actual per-access point load is greater than the per-access point test load, further verification is performed (step 508) and process 600 is executed. However, if the actual per-access point installation load is less than the per-access point test load, then it has been shown by inference that the actual per-access point load at the actual RF signal strength will support the timing specifications of the actual mission-critical applications. No further load testing is performed.

Sub-process 600, as detailed by FIG. 6, is followed in the event that (1) comparison of the actual per-access point load, (2) the actual RF signal strength to the per-access point test load or, (3) test RF signal strength fails to indicate that the actual installation can support the mission-critical timing applications. Sub-process 600 verifies the proper operation of the mission-critical applications under real-time conditions, rather than by modeling. The mission-critical applications are installed on the network and the actual timing parameters are monitored for compliance with the desired performance while subjecting the actual network to the test load conditions.

In step 601, the application types contained in the per-access point installation are analyzed to determine which are mission-critical applications.

In step 602, it is determined which applications have timing specifications and the values of such specifications. The intersection of the outputs of 601 and 602 is the set of mission-critical applications and their corresponding timing specifications. Nurse call, clinician alarm notification, voice applications utilized by clinicians and physicians, location technology, infusion pumps, and patient vital signs monitoring are examples of mission-critical applications which desirably have a minimal network latency and sufficient bandwidth to provide acceptable levels of latency and loss of data. Applications such as e-mail, medical record keeping and visualization of medical imaging are not required by their users to have immediate response and can be subject to larger delays in the transmission of their data. Other applications, such as wireless VoIP may not be mission-critical in that cellular or desk telephones are available, but VoIP and its 50 ms latency limit would be part of the minimum set of timing specifications, even if it is not part of the more stringent test load.

In step 602, the applications identified in step 601 which have mission-critical timing specifications, are cataloged in record 610, along with the values of those timing specifications. These critical timing parameter values will be measured during the verification of the actual per-access point load and compared to the values of the critical timing specifications. Wireless VoIP phones typically require a signal strength of −65 to −67 dBm and a signal-to-noise ratio of 25 dB. Latency for VoIP applications may not exceed 50 ms in order to maintain good voice quality communications and reliable clinician communications. Patient monitoring applications often require less than 1 minute of dropout per day for 802.11 patient telemetry at latencies of 200 ms maximum.

With the critical timing specifications and mission-critical applications determined from step 602, the verification that a single access point can provide the support for these mission-critical applications when operating with the actual per-access point load at the actual RF signal strength begins. In step 603, a determination is made as to which access points in the actual installation network have the worst-case load such that the load testing performed on the installation network will reflect the most stringent load that will be seen by the mission-critical applications.

In step 604, the worst-case installation access point is loaded with the actual per-access point load at the actual RF signal strength. Network performance tools, such as IxChariot by Ixia, are designed to provide operation on wireless clients associated with an access point that represents application load including VoIP traffic, ftp file transfers, streaming audio and video, e-mail, and web browser transactions. For some devices, roaming is an essential part of the operation. In this case, there may be at least two access points and during the test, devices are forced to roam from one access point to another. Preferably, both access points run at the actual per-access point load. While the access point is operating with the actual per-access point installation load, the mission-critical parameters are measured by the network performance tool in step 605.

In step 606, the actual timing parameters are compared to the desired timing specifications. The results of this comparison are analyzed in step 607.

If the critical timing specifications are met, then verification is complete. In step 608, the mission-critical timing specifications and their corresponding measured parameters are recorded into the actual installation verification record 611. Verification of the actual installation to support the mission-critical applications is then complete.

If the results of the analysis of step 607 indicate that the critical timing specifications are not met, then the actual per-access point load may be re-established (step 609) to present a new per-access point load to the single worst-case access point which can allow for the mission-critical timing specifications to be met (step 403 of FIG. 4 is re-executed). By returning to step 403 in FIG. 4, the actual per-access point load can be re-established by beginning with the re-analysis of the actual access point RF coverage area.

By reducing the size of the actual access point RF coverage area, the number of users of mission-critical applications that are serviced is reduced and the actual per-AP load is decreased. With a higher density of access points (and constant radio transmit power), the number of devices supported by each access point is decreased and the RF signal is stronger. Together, these provide a higher probability that the mission-critical timing parameters are met for the new per-access point load. To force a smaller access point coverage area, one can decrease the access point's transmit power. This has the effect of reducing the number and types of users that are included in the per-access point RF coverage area, and decreasing the per-access point load and thus, increasing the probability that the mission-critical parameter values of that load are supported. This solution does not result in a higher RF signal strength, but does decrease the RF background noise that other access points see and is preferable to a dense access point deployment with high-powered access point transmitters. The process 400, 500, and 600 are repeated until all critical timing specifications are met and the actual installation verification record 611 can be established.

EXAMPLE 1

A sample report 310 is provided in this example which specifies a test load, test timing specifications, and a test signal strength for a single access point. In the instant example, the report 310 is based upon an industry survey of the medical industry.

| Test Load | | | | |
|---|---|---|---|---|
| Type | # loads | File size (bytes) | Once every: | Data rate |
| HTTP | 2 | 100,000 to 500,000 | 5 to 120 sec. | 10 Mbps |
| HTTP | 6 | 3000 to 50,000 | 1 to 30 sec. | 10 Mbps |
| Exchange email | 2 | 1420 | 2 to 60 sec. | 10 Mbps |
| Pop3 email | 1 | 50,000 to 200,000 | 60 to 120 sec. | 10 Mbps |
| Audio | 2 | n/a | Streaming | 80.736 kbps |
| Video (2 way) | 1 | n/a | Streaming | 2.05 Mbps |
| Video (1 way) | 1 | n/a | Streaming | 1.2 Mbps |
| VoIP/G.711 | 3 | 164 (packet size) | 20 msec. | 64 kbps |
| Patient Telemetry | 20 | 5 kbits per packet | 1 sec. | 25 kbps |
| Clinician Notifier | 5 | 12,500 | 1 sec | 10 Mbps |
| Infusion Pump Status | 2 | 1 kbit per packet | Continuous | 1 pkt per sec. |

| Test Timing Parameters for Mission-Critical Applications | | |
|---|---|---|
| Application | Critical Timing Parameter | Specification |
| VoIP | Latency | 50 ms max |
| Patient Telemetry | Latency | 200 ms max |

-continued

Test Timing Parameters for Mission-Critical Applications

| Application | Critical Timing Parameter | Specification |
|---|---|---|
| Clinician Notifier | Latency | 200 ms max |
| Infusion Pump Alert | Latency | 200 ms max |

Test RF Signal Strength

| | |
|---|---|
| Test RF Signal Strength | −65 dBm |
| Min RF Signal Strength | −70 dBm |

As shown under the title "Test Load" several types of applications have their loads specified. In the present example, the survey indicated that two different types of HTTP applications are in use—a first HTTP which transmits data (total size 100,000 to 500,000 bytes) once every 5 to 120 seconds at a rate of 10 Mbps and a second HTTP which transmits data (total size 3,000 to 50,000 byes) once every 1 to 30 seconds at a rate of 10 Mbps. The single access point has two such first HTTP applications and six such second HTTP applications connected thereto. Other application types are also listed in the test load.

Report 310 also provides test timing parameters for the mission-critical applications. In the present example, VoIP applications, patient telemetry applications, clinician notifier applications, and infusion pump alert applications are determined to be mission-critical applications. As such, the corresponding timing parameters (latency) and the desired specifications are provided in report 310 for each application. The minimal and test signal strength are also reported in report 310.

EXAMPLE 2

In this example of report 611, we assumed a 1.5 safety factor between the model and test load defined elsewhere in this specification, and the test load was verified to provide acceptable results. All bandwidth (BW) values are in kbps. Report 611 could be based on user type or load type or both. In this example, we provide both. Since the actual hospital load is below the test load, the installation is in compliance.

| Load/User Type | Test/Actual peak user loads | Test/Actual Peak BW | Test/Actual Average BW |
|---|---|---|---|
| Physicians | 8/4 | 12000/7500 | 129/57 |
| Nurses | 5/3 | 6400/3235 | 58/27 |
| Staff | 6/3 | 150/97 | 15/7 |
| Patients | 23/10 | 305/127 | 305/127 |
| Guest | 25/12 | 1000/1000 | 100/83 |
| Clinical Use | | | |
| HTTP | 5/3 | 3000/2134 | 107/37 |
| E-mail Send | 5/2 | 8000/1420 | 27/17 |
| E-mail Receive | 5/3 | 8000/1175 | 27/14 |
| Pt. Telemetry | 23/10 | 288/125 | 288/125 |
| Infusion Pumps | 23/12 | 46/12 | 46/12 |
| Wireless VoIP | 5/3 | 425/255 | 80/42 |
| Guest Use | | | |
| Internet Access (all applications) | 12 | 1000/1000 | 342/215 |

| Load/User Type | Test/Actual peak user loads | Test/Actual Peak BW | Test/Actual Average BW |
|---|---|---|---|
| RF conditions | | | |
| Signal Strength | −65/−62 dBm | | |
| Noise Floor | −82/−85 dBm | | |
| Timing Specifications (TSpecs) | | | |
| VoIP- Latency | Limit <50 ms | Test <42 ms | |
| VoIP- Jitter | Limit <50 ms | Test <27 ms | |
| Telemetry- Latency | Limit <250 ms | Test <42 ms | |

EXAMPLE 3

In this example of report 611, we assumed a 1.5 safety factor between the model and test load defined elsewhere in this specification, and the test load was verified to provide acceptable results. All bandwidth (BW) values are in kbps. Report 611 could be based on user type or load type or both. In this example, we provide both. Since the actual hospital load is above the test load, the installation is out of compliance.

| Load/User Type | Test/Actual peak user loads | Test/Actual Peak BW | Test/Actual Average BW |
|---|---|---|---|
| Physicians | 8/6 | 12000/15500 | 129/137 |
| Nurses | 5/3 | 6400/3235 | 58/27 |
| Staff | 6/3 | 150/97 | 15/7 |
| Patients | 23/10 | 305/127 | 305/127 |
| Guest | 25/12 | 1000/1000 | 100/83 |
| Clinical Use | | | |
| HTTP | 5/3 | 3000/2134 | 107/37 |
| E-mail Send | 5/2 | 8000/1420 | 27/17 |
| E-mail Receive | 5/3 | 8000/1175 | 27/14 |
| Pt. Telemetry | 23/10 | 288/125 | 288/125 |
| Infusion Pumps | 23/12 | 46/12 | 46/12 |
| Wireless VoIP | 5/10 | 425/850 | 80/160 |
| Guest Use | | | |
| Internet Access (all applications) | 12 | 1000/1000 | 342/215 |
| RF conditions | | | |
| Signal Strength | −65/−62 dBm | | |
| Noise Floor | −82/−85 dBm | | |
| Timing Specifications (TSpecs) | | | |
| VoIP- Latency | Limit <50 ms | Test <42 ms | |
| VoIP- Jitter | Limit <50 ms | Test <27 ms | |
| Telemetry- Latency | Limit <250 ms | Test <42 ms | |

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A method to pre-verify the operation of a wireless network for its intended use comprising the steps of:

a. examining an industry which uses a network, wherein a plurality of applications wirelessly transmit data over the network through at least one wireless access point;
b. establishing a model load for the industry based upon the examination;
c. establishing a test load based on the model load by augmenting the model load with a safety factor whose value is greater than or equal to one;
d. specifying at least one selected application from the plurality of applications;
e. determining desired timing specifications of the selected applications;
f. loading a test wireless access point with the test load;
g. measuring timing parameters of the selected applications over the test wireless access point while the test load is applied; and
h. comparing the desired timing specifications to the measured timing parameters.

2. The method as recited in claim 1, wherein the selected application is running on a device, and a report is provided with the device, wherein the report references the device, thus specifying operational parameters for the device.

3. The method as recited in claim 1, wherein the safety factor is one, thus the test load is equal to the model load.

4. The method as recited in claim 1, wherein the safety factor is a number from one to two.

5. The method as recited in claim 1, wherein the step of examining the industry includes the step of selecting properties of the network, wherein the network simulates a medical industry network.

6. The method as recited in claim 5, wherein the medical industry network is a hospital network.

7. The method as recited in claim 1, wherein the step of examining the industry includes the step of determining the types of devices connected to the network.

8. The method as recited in claim 1, wherein the step of examining the industry includes the step of determining the types of applications wirelessly transmitting data over the network.

9. The method as recited in claim 1, wherein the step of examining the industry includes the steps of
a. determining the types of applications wirelessly transmitting data over the network in the industry;
b. determining the load of each type of application;
c. determining the number of users of each type of application; and
d. determining the number of wireless access points connected to the network.

10. The method as recited in claim 1, wherein the step of examining the industry includes the step of determining the types of users and number of users connected to the network.

11. The method as recited in claim 1, wherein the step of examining the industry includes the step of determining the number of users per-wireless access point connected to the network.

12. The method as recited in claim 1, wherein the step of examining the industry includes the step of determining the wireless access point density of the network, wherein the model load is dependent upon the wireless access point density.

13. The method as recited in claim 12, further comprising: if the desired timing specifications are not met, the steps of modifying the access point density, thus altering the test load.

14. The method as recited in claim 1, further comprising: if the desired timing specifications are met, then providing a customer with a report which includes the result of such comparison.

15. A method to pre-verify the operation of a wireless network for its intended use comprising the steps of:
a. examining an industry which uses a network, wherein a plurality of applications wirelessly transmit data over the network through at least one wireless access point;
b. establishing a model load for the industry based upon the examination;
c. establishing a test load based on the model load by augmenting the model load with a safety factor whose value is greater than or equal to one;
d. specifying at least one selected application from the plurality of applications;
e. determining performance specifications of the selected applications;
f. loading a wireless access point with the test load;
g. measuring performance specifications of the selected applications over the wireless access point while the test load is applied;
h. comparing the performance specifications to the measured performance specifications.

16. A method to verify a pre-tested wireless load will work in an actual environment comprising the steps of:
a. examining an actual network that has at least two types of applications wirelessly transmitting data over the network and measuring the actual load which includes an actual radio frequency signal strength, and an actual radio frequency signal to noise ratio;
b. comparing the actual load, including the actual radio frequency signal strength, and the actual radio frequency signal to noise ratio to a pre-tested load which includes a pre-tested radio frequency signal strength, and a pre-tested radio frequency signal to noise ratio; and
c. ensuring that the actual load is less than the pre-tested load, the actual radio frequency signal strength is greater than the pre-tested radio frequency signal strength, and the actual radio frequency signal to noise ratio is greater than the pre-tested radio frequency signal to noise ratio.

17. The method as recited in claim 16 wherein at least one of the applications is a clinic application.

* * * * *